United States Patent
Barham et al.

(10) Patent No.: US 6,726,845 B1
(45) Date of Patent: Apr. 27, 2004

(54) DEXTRAN STARCH AND FLOCCULANT COMBINATION FOR IMPROVING RED MUD CLARIFICATION

(75) Inventors: Scott Barham, Floreat (AU); James Morton Tippett, Oatley (AU)

(73) Assignee: Ondeo Nalco Company, Naperville, IL (US)

(*) Notice: Subject to any disclaimer, the term of this patent is extended or adjusted under 35 U.S.C. 154(b) by 0 days.

(21) Appl. No.: 09/701,160
(22) PCT Filed: May 19, 1999
(86) PCT No.: PCT/US99/10961
§ 371 (c)(1), (2), (4) Date: Feb. 15, 2001
(87) PCT Pub. No.: WO99/61129
PCT Pub. Date: Dec. 2, 1999

(30) Foreign Application Priority Data

May 25, 1998 (AU) .................................................. PP3704

(51) Int. Cl.$^7$ ............................................. B01D 21/01
(52) U.S. Cl. ........................... 210/727; 209/5; 210/730; 210/731; 210/733; 423/121; 423/122
(58) Field of Search ................................. 210/728, 730, 210/731, 732, 733, 734; 252/60, 180, 181; 423/121, 122, 130, 131; 536/102, 112

(56) References Cited

U.S. PATENT DOCUMENTS

| | | | |
|---|---|---|---|
| 3,085,853 A | 4/1963 | Lesinski et al. | 210/730 |
| 3,390,959 A | 7/1968 | Sibert | 210/733 |
| 3,397,953 A | 8/1968 | Galvin et al. | 210/731 |
| 3,445,187 A | 5/1969 | Sibert | 210/733 |
| 3,541,009 A | 11/1970 | Arendt et al. | 210/728 |
| 3,681,012 A | 8/1972 | Sibert | 210/728 |
| 4,767,540 A | 8/1988 | Spitzer et al. | 210/734 |
| 5,008,089 A | 4/1991 | Moody et al. | 210/730 |
| 5,217,620 A | 6/1993 | Mahoney et al. | 210/728 |
| 5,516,435 A * | 5/1996 | Lewellyn | 209/5 |
| 5,853,677 A * | 12/1998 | Avotins et al. | 209/5 |
| 5,951,955 A * | 9/1999 | Flieg et al. | 210/734 |

* cited by examiner

Primary Examiner—Peter A. Hruskoci
(74) Attorney, Agent, or Firm—Margaret M. Brumm; Thomas M. Breininger

(57) ABSTRACT

The claimed invention is a method for separating Bayer process red mud from a Bayer process liquor which comprises adding to a Bayer process liquor containing red mud an effective amount of a water soluble synthetic flocculant, dextran and starch combination. The flocculant is added anywhere in the slurry containing the red mud suspended in Bayer process liquor, or in a liquor slurry containing bauxite prior to or during digestion. Once the flocculant combination is added, it is mixed sequentially with the Bayer process liquor and the red mud contained in the Bayer process liquor is removed by sedimentation, centrifugation or filtration.

1 Claim, 2 Drawing Sheets

DEXTRAN STARCH AND FLOCCULANT COMBINATION FOR IMPROVING RED MUD CLARIFICATION

CROSS REFERENCE TO RELATED APPLICATION

This application claims the priority of the Australian patent application Serial No: PP 3704 entitled "DEXTRAN STARCH AND FLOCCULANT COMBINATION FOR IMPROVING RED MUD CLARIFICATION" filed on May 25, 1998.

BACKGROUND OF INVENTION

In the Bayer process for the production of alumina, bauxite ore is pulverized, slurred in water, and then digested with caustic at elevated temperatures and pressures. The caustic solution dissolves oxides of aluminum, forming an aqueous sodium aluminate solution. The caustic-insoluble constituents of bauxite ore (referred to as red mud") are then separated from the aqueous phase containing the dissolved sodium aluminate. Solid alumina trihydrate product is precipitated out of the solution and collected as product.

In more detail, the pulverized bauxite ore is fed to a slurry mixer where a water slurry is prepared. The slurry makeup water is typically spent liquor (described below) and added caustic. This bauxite ore slurry is then diluted and passed through a digester or a series of digesters where alumina is released from the ore as caustic-soluble sodium aluminate. The digested slurry is then cooled to about 110° C. (about 230° F.), typically employing a series of flash tanks wherein heat and condensate are recovered. The aluminate liquor leaving the flashing operation contains from about 1 to about 20 weight percent suspended solids, which solids consist of the insoluble residue that remains after, or is precipitated during, digestion. The coarser solid particles may be removed from the aluminate liquor with a "sand trap" cyclone. The finer solid particles are generally separated from the liquor first by settling and then by filtration, if necessary. The slurry of aluminate liquor and the finer solids is normally first fed to the center well of a mud settler, or primary settler, where it is treated with a flocculant, and as the mud settles, clarified sodium aluminate solution, referred to as "green" or "pregnant" liquor, overflows a weir at the top. This overflow from the mud settling tank is passed to the subsequent process steps. If the aluminate liquor overflowing the settler contains an unacceptable concentration of suspended solids (at times from about 50 to about 500 mg of suspended solids per liter), it is then generally further clarified by filtration to give a filtrate with no more than about 10 mg suspended solids per liter of liquor. The treatment of the liquor collected after the primary settlement to remove any residual suspended solids before alumina trihydrate is recovered is referred to as a secondary clarification stage.

The clarified sodium aluminate liquor is seeded with alumina trihydrate crystals to induce precipitation of alumina in the form of alumina trihydrate, $AL(OH)_3$. The alumina trihydrate particles or crystals are then separated from the concentrated caustic liquor, and the remaining liquid phase, the spent liquor, is returned to the initial digestion step and employed as a digestant after reconstitution with caustic.

In another section of the Bayer circuit, the settled solids of the primary settler ("red mud") are withdrawn from the bottom of the settler and passed through a countercurrent washing circuit for recovery of sodium aluminate and soda. The countercurrent washing circuit utilizes two or more washers which receive a mud washer feed slurry from either the settler underflow or other washer underflow, as well as any dilution liquor. As noted above, the red mud does not include any coarser particles removed prior to feeding the slurry to the primary or mud settler.

The at least partial separation of the red mud solids from the pregnant liquor at elevated temperatures by settling or by filtration is expedited by the use of a flocculant. This initial clarification of the pregnant liquor into a clarified liquor phase is referred to as the primary settler state. Flocculating agents improve the separation of insolubles by increasing the rate at which the solids settle, by reducing the amount of residual solids suspended in the liquor, and by decreasing the amount of the liquor in the settled solids phase. Flocculation performance is highly important in the primary settlement stages. Red muds are comprised chiefly of iron oxides (at least about 50 weight percent of the red mud solids), together with silicon oxides, calcium oxides, sodium alumino-silicates, titanium oxides and other materials, and commonly represent from about 5 to about 50 percent of the dry weight of the bauxite ore. Generally these muds are comprised of very fine particles, which hinder the desired rapid and clean separation of red mud particles from the soublized alumina liquor. If the rate of separation is slow, output is materially diminished and overall process efficiency is impaired. If the separation is not clean, the resultant aluminate liquor will require a more extensive treatment to remove residual solids, and/or the alumina trihydrate recovered will contain levels of impurities that are undesirably high for many end uses.

The polysaccharides starch and dextran have, for some time, been used in red mud flocculation. For instance, U.S. Pat. No. 3,085,853, Apr. 16, 1963, Lesinski et al., uses native dextrans to increase the rate of sedimentation of finely divided solids in aqueous suspensions and thereby facilitate the separation of such solids. Later synthetic polymeric flocculants became more commonly employed for the Bayer process. U.S. Pat. No. 3,390,959 issued Jul. 2, 1968 to Sibert, uses acrylate homopolymers and copolymers which contain not more than 20% of other ethylenically unsaturated polymerizable polar monomers for the Bayer process. Included in Siber's polar commoners are acrylamide and diethylvinylphosphonate, among others. Diethylvinylphosphonate is the diethyl ester of vinylphosphonic acid, and can be hydrolyzed to the monoethyl ester in caustic solution.

U.S. Pat. No. 3,397,953, Aug. 20, 1968, Galvin et al., uses a blend of starch and polyacrylic acid on red mud suspensions, noting that polyacrylic acid alone is not suitable as a flocculating agent. The polyacrylic acids exemplified generally have molecular weights of less than 300,000. The flocculation and sedimentation activity of the blend is exemplified in the primary settler stage of a bauxite process. U.S. Pat. No. 3,445,187, May 20, 1969, Sibert, uses synthetic acrylic acid polymer alone to enhance the rate of separation of red mud solids from the aqueous caustic solutions during secondary clarification steps. The synthetic polymer used contains at least about 80 weight percent of the acrylic acid mer unit, and has a molecular weight in excess of 50,000, and preferably in excess of 100,000. U.S. Pat. No. 3,541,009, Nov. 17, 1970, Arendt et al., uses a combination of causticized or modified starch, a water soluble polymer, and a caustic alkali to enhance the coagulation, sedimentation and/or filtration of aqueous suspensions of solids, including the settling of red mud from Bayer process liquor. The water soluble polymer is derived from at least one olefinically-unsaturated monomer and has a molecular weight in excess of 100,000.

U.S. Pat. No. 3,681,012, Aug. 1, 1972, Sibert, uses acid acrylic polymer most preferably having molecular weight of at least, 1,000,000, either alone or in combination with starch, for clarification of digested bauxite containing solublized alumina and red mud residues. U.S. Pat. No. 4,767,540, Aug. 30, 1988, Spitzer et al., uses a polymer that contains hydroxamic acid groups for the same purpose. U.S. Pat. No. 5,008,089, Apr. 16, 1991, Moody et al., uses a combination of dextran and synthetic anionic polymer for flocculating red mud in Bayer process liquors.

U.S. Pat. No. 5,217,620, Jun. 8, 1993, Mahoney et al., uses a combination of pullulan, lacatan, rhamsan, or zooglan with a conventional water soluble anionic flocculant for red mud settling.

The synthetic flocculating agents employed for the settling of filtration of red mud are generally water soluble polymers of one or more ethylenically-unsaturated monomers, and have been used together, as noted above, with starch or dextran for aluminate liquor clarification. The synthetic flocculating agents are usually anionic, and the optimum anionic content of such polymer is usually related to the alkalinity of the liquor. In the washing circuit, the early wash liquors have the highest alkalinity and may require a more highly anionic polymer than the later wash liquors.

It is an object of the present invention to provide a more effective flocculation for separating red mud from the red mud-containing liquors, particularly preferably the primary settler liquor, of the Bayer process. It is a preferred object of the present invention to provide an improved method whereby the suspended solids retained in the supernatant phase after flocculation of the red mud-containing liquors, particularly the primary settler liquor, of the Bayer process are diminished. It is further preferred objects of the present invention to provide a more effective Bayer process wherein flocculation for separating red mud from the red mud-containing liquors particularly the primary settler liquor, is improved by a more complete flocculation of the solids.

DISCLOSURE OF THE INVENTION

In a first aspect, the present invention provides a method for treating Bayer process liquor containing red mud comprising contacting the Bayer process liquor with, in combination, an effective amount of a water soluble synthetic flocculant, dextran and starch prior to separating the red mud from the liquor.

In a second aspect, the present invention provides an agent for treatment of Bayer process liquor containing red mud said agent comprising, in combination, a water soluble synthetic flocculant, dextran and starch in amounts effective to increase separation of the red mud from the Bayer process liquor.

The combination preferably contacts the slurry containing the red mud suspended in Bayer process liquor, or a liquor slurry containing bauxite prior to or during digestion. The dextran, starch and flocculant combination can be added to the Bayer process liquor separately or together provided that in at least one point of the process a combination of all three components are present in the Bayer process liquor. If the three components are added separately, they may be added in any order, but it is preferred to add the starch and polymer (separately or together) prior to the addition of the dextran. In preferred embodiments, the starch and polymer are added to the process upstream from the point of addition of the dextran.

Once the components of the combination are added, they are mixed sequentially with the Bayer process liquor, and the red mud contained in the Bayer process liquor is removed by sedimentation, centrifugation or filtration.

Water-soluble synthetic flocculants which may be used in combination with dextran and starch include, but are not limited to acrylates, homopolymers of acrylic acid, copolymers of acrylic acid and acrylamide and copolymers of acrylic acid and acrylamide modified to contain a hydroxamic acid or acrylic acid moieties. Particularly preferred are ammonium acrylate polymers because of their replacement ratio and apparent synergy. The red mud thus treated may be separated from the liquor phase using a separator selected from the group consisting of settlers, thickeners, centrifuges and filters.

Preferably, the combination which contacts the Bayer process liquor is used in an amount of from about 0.01 to about 10 grams per liter of Bayer process liquor treated. The combination is more preferably used in an amount of from about 0.1 to about 2 grams per liter of liquor treated. The combination may contact the Bayer process liquor anywhere. For example the combination may contact the Bayer process liquor at a point selected from the group consisting of the primary settler feed, bauxite pretreatment, bauxite digestion and flash tanks. As stated above the dextran, starch and polymer may be added to the liquor separately or together. Preferably the starch and polymer may be added to the liquor separately as far back upstream from the addition of dextran as possible (the further back, the better for clarity reduction). For example the starch and polymer can be added as one solution or separately to a thickener feed line followed by addition of dextran to the feed line just prior to the feedwell or into the feedwell via sparges. Preferably the combination contacts the Bayer Process liquor in the primary settler feed.

BRIEF DESCRIPTION OF DRAWINGS

The present invention will now be described by way of reference to the following non-limitative examples and drawings in which.

BEST MODE FOR CARRYING OUT THE INVENTION

Figure 1:
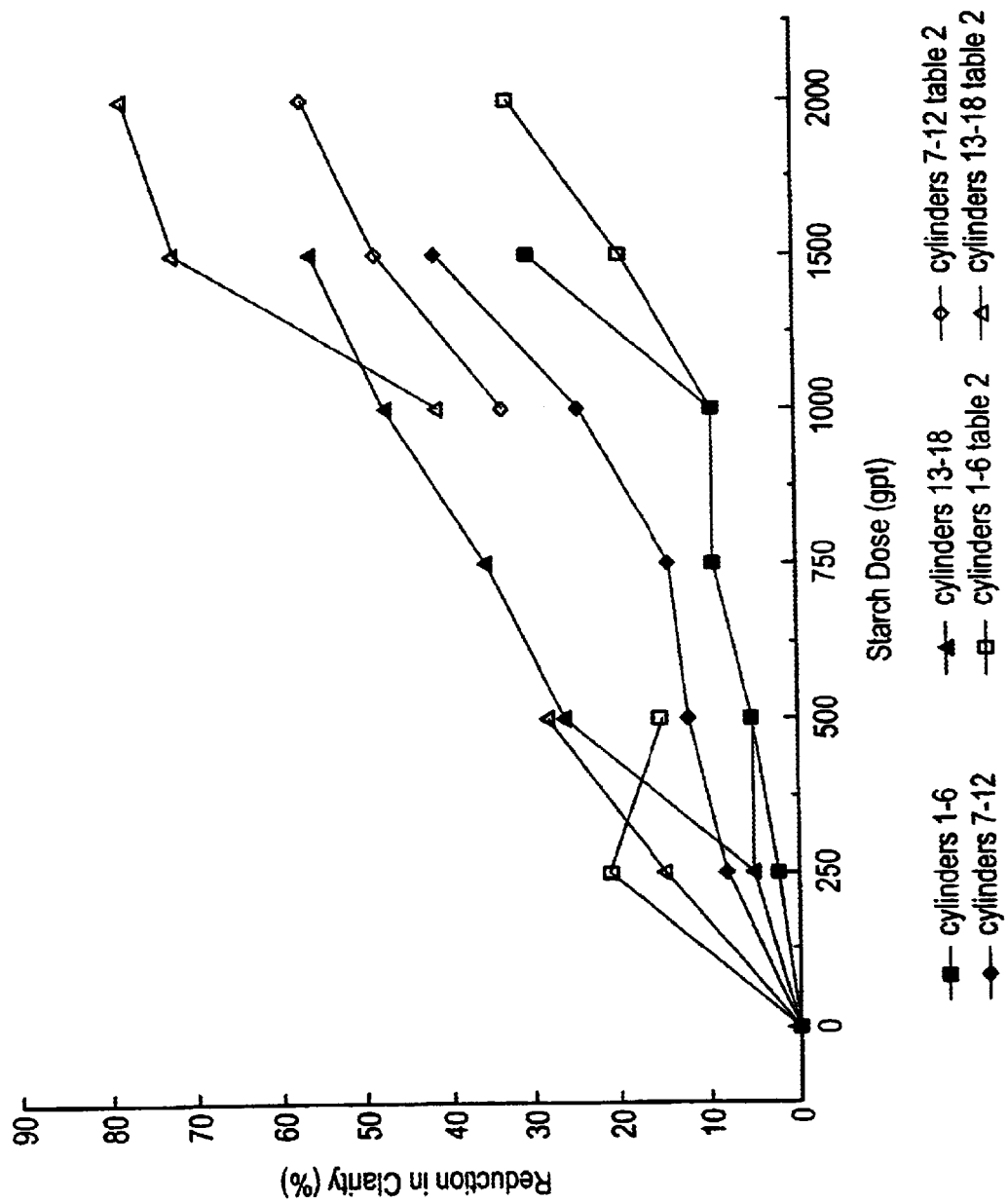
FIG. 1 is a graph comparing dosage of starch in grams per tonne (GPT) to reduction in clarity and FIG. 2 is a graph comparing additions of various constituents in grams per tonne and their effect on clarity.

To evaluate the effectiveness of the combination, is settling tests were completed in a waterbath with temperature maintained at 96° C. Eighteen (18) cylinder of identical mud/liquor characteristics were tested during one experiment.

High Molecular Weight Homopolymer Ammonium Acrylate (hereinafter referred to as Polymer A) with a molecular weight greater than 10 million and supplied by Nalco was diluted in spent liquor to a concentration of 1.5 gpl (0.15%) by introducing the neat polymer to the vortex produced by a cage stirrer at 800 RPM and mixing four five (5) minutes. Dextran (hereinafter referred to as Polymer B) was diluted in lake water to a concentration of either 5 or 10 gpl (0.5 or 1.0%) by gentle mixing by shaking the bottle by hand. Starch was supplied as a 400 gpl (40%) solution and diluted with lakewater to 100 gpl (10%), and then further diluted with spent liquor to a final concentration of 20 gpl (2%) again by shaking the bottle by hand.

Polymer and Starch solutions were added together and the cylinders mixed using a gang plunger which allows six (6) cylinders to be tested at one time. After addition and mixing of polymer and starch solutions the dextran solution was added and further mixing completed using the gang plunger.

Settling rate is presented in m/h and determined by measuring the time for flocculated mud particles to settle from 1000 ml to 600 ml in a 1000 ml cylinder.

Clarity was determined by decanting 250 ml of supernatant from the top of the settled cylinder after 30 minutes, adding 75 ml of 10N NaOH and boiling mixture to negate any precipitation of hydrate. After boiling, the liquor was cooled and passed through a turbidity meter and clarity determined and presented in NTU units.

The results of these tests showing the various synthetic flocculant/starch/dextran dosages are shown in tables 1 and 2.

TABLE 1

| Cylinder | Plunges After Polymer/ Starch Addition | Plunges After Dextran Addition | Polymer Dose (ml) | Polymer Dose (gpt) | Starch Dose (ml) | Starch Dose (gpt) | Dextran Dose (ml) | Dextran Dose (gpt) | Settling Rate (m/h) | Clarity (NTU) | Reduction in Clarity (%) |
|---|---|---|---|---|---|---|---|---|---|---|---|
| 1 | 20 | 10 | 4.0 | 150 | 0.0 | 0 | 0.4 | 100 | 2.9 | 220 | 0 |
| 2 | 20 | 10 | 4.0 | 150 | 0.5 | 250 | 0.4 | 100 | 3.4 | 215 | 2 |
| 3 | 20 | 10 | 4.0 | 150 | 1.0 | 500 | 0.4 | 100 | 4.1 | 210 | 5 |
| 4 | 20 | 10 | 4.0 | 150 | 1.5 | 750 | 0.4 | 100 | 0.1 | 200 | 9 |
| 5 | 20 | 10 | 4.0 | 150 | 2.0 | 1000 | 0.4 | 100 | 4.5 | 200 | 9 |
| 6 | 20 | 10 | 4.0 | 150 | 3.0 | 1500 | 0.4 | 100 | 4.9 | 155 | 30 |
| 7 | 20 | 10 | 4.0 | 150 | 0.0 | 0 | 0.8 | 200 | 3.8 | 245 | 0 |
| 8 | 20 | 10 | 4.0 | 150 | 0.5 | 250 | 0.8 | 200 | 4.4 | 225 | 8 |
| 9 | 20 | 10 | 4.0 | 150 | 1.0 | 500 | 0.8 | 200 | 4.4 | 215 | 12 |
| 10 | 20 | 10 | 4.0 | 150 | 1.0 | 750 | 0.8 | 200 | 4.5 | 210 | 14 |
| 11 | 20 | 10 | 4.0 | 150 | 2.0 | 1000 | 0.8 | 200 | 4.5 | 185 | 24 |
| 12 | 20 | 10 | 4.0 | 150 | 3.0 | 1500 | 0.8 | 200 | 5.1 | 145 | 41 |
| 13 | 20 | 10 | 4.0 | 150 | 0.0 | 0 | 1.6 | 400 | 4.5 | 215 | 0 |
| 14 | 20 | 10 | 4.0 | 150 | 0.5 | 250 | 1.6 | 400 | 4.6 | 205 | 5 |
| 15 | 20 | 10 | 4.0 | 150 | 1.0 | 500 | 1.6 | 400 | 5.4 | 160 | 26 |
| 16 | 20 | 10 | 4.0 | 150 | 1.5 | 750 | 1.6 | 400 | 5.6 | 140 | 35 |
| 17 | 20 | 10 | 4.0 | 150 | 2.0 | 1000 | 1.6 | 400 | 5.8 | 115 | 47 |
| 18 | 20 | 10 | 4.0 | 150 | 3.0 | 1500 | 1.6 | 400 | 6 | 95 | 56 |

TABLE 2

| Cylinder | Plunges After Polymer/ Starch Addition | Plunges After Dextran Addition | Polymer Dose (ml) | Polymer Dose (gpt) | Starch Dose (ml) | Starch Dose (gpt) | Dextran Dose (ml) | Dextran Dose (gpt) | Settling Rate (m/h) | Clarity (NTU) | Reduction in Clarity (%) |
|---|---|---|---|---|---|---|---|---|---|---|---|
| 1 | 30 | 10 | 6.0 | 225 | 0.0 | 0 | 0 | 0 | 1.7 | 235 | 0 |
| 2 | 30 | 10 | 6.0 | 225 | 0.5 | 250 | 0 | 0 | 2.2 | 185 | 21 |
| 3 | 30 | 10 | 6.0 | 225 | 1.0 | 500 | 0 | 0 | 3.2 | 200 | 15 |
| 4 | 30 | 10 | 6.0 | 225 | 2.0 | 1000 | 0 | 0 | 3.6 | 215 | 9 |
| 5 | 30 | 10 | 6.0 | 225 | 3.0 | 1500 | 0 | 0 | 4.6 | 190 | 19 |
| 6 | 30 | 10 | 6.0 | 225 | 4.0 | 2000 | 0 | 0 | 4.6 | 160 | 32 |
| 7 | 30 | 10 | 6.0 | 225 | 0.0 | 0 | 1 | 250 | 3 | 210 | 0 |
| 8 | 30 | 10 | 6.0 | 225 | 0.5 | 250 | 1 | 250 | 3.7 | 200 | 5 |
| 9 | 30 | 10 | 6.0 | 225 | 1.0 | 500 | 1 | 250 | 4.5 | 200 | 5 |
| 10 | 30 | 10 | 6.0 | 225 | 2.0 | 1000 | 1 | 250 | 4.6 | 140 | 33 |
| 11 | 30 | 10 | 6.0 | 225 | 3.0 | 1500 | 1 | 250 | 6.4 | 110 | 48 |
| 12 | 30 | 10 | 6.0 | 225 | 4.0 | 2000 | 1 | 250 | 4.6 | 90 | 57 |
| 13 | 30 | 10 | 6.0 | 225 | 0.0 | 0 | 2 | 500 | 4.1 | 230 | 0 |
| 14 | 30 | 10 | 6.0 | 225 | 0.5 | 250 | 2 | 500 | 4.1 | 195 | 15 |
| 15 | 30 | 10 | 6.0 | 225 | 1.0 | 500 | 2 | 500 | 4.8 | 165 | 28 |
| 16 | 30 | 10 | 6.0 | 225 | 2.0 | 1000 | 2 | 500 | 4.5 | 135 | 41 |
| 17 | 30 | 10 | 6.0 | 225 | 3.0 | 1500 | 2 | 500 | 5.4 | 65 | 72 |
| 18 | 30 | 10 | 6.0 | 225 | 4.0 | 2000 | 2 | 500 | 5 | 50 | 78 |

The results are also shown in the attached FIG. 1. It can be seen from the figure that including dextran and polymer in a starch flocculant combination resulted in a marked improvement in clarity.

To highlight the synergistic effect of the various constituents of the treatment agent, further tests were carried out with various dosages of the water soluble synthetic flocculant, starch and dextran. The synthetic flocculant (hereinafter referred to as Nalco 85111) was a high molecular weight ammonium acrylate with a molecular weight greater than 10 million made up at 0.18% solution in lake water. The starch was made up to 1.1% in spent liquor as per conventional plant practice. The dextran (hereinafter referred to as Nalco 85711) had a molecular weight of greater than 500,000 and was made up as a 1% solution in lake water.

As with the previous examples, the polymer and starch were added first. The combination of slurry, starch and Nalco 85111 were mixed by plunging 10 times and then the Nalco 85711 dextran added and mixed by plunging a further five times.

The clarity tests were conducted in a manner similar to the aforementioned examples, however, the clarity was determined after five minutes to allow the differences in dosages to be more clearly identified.

Figure 2:
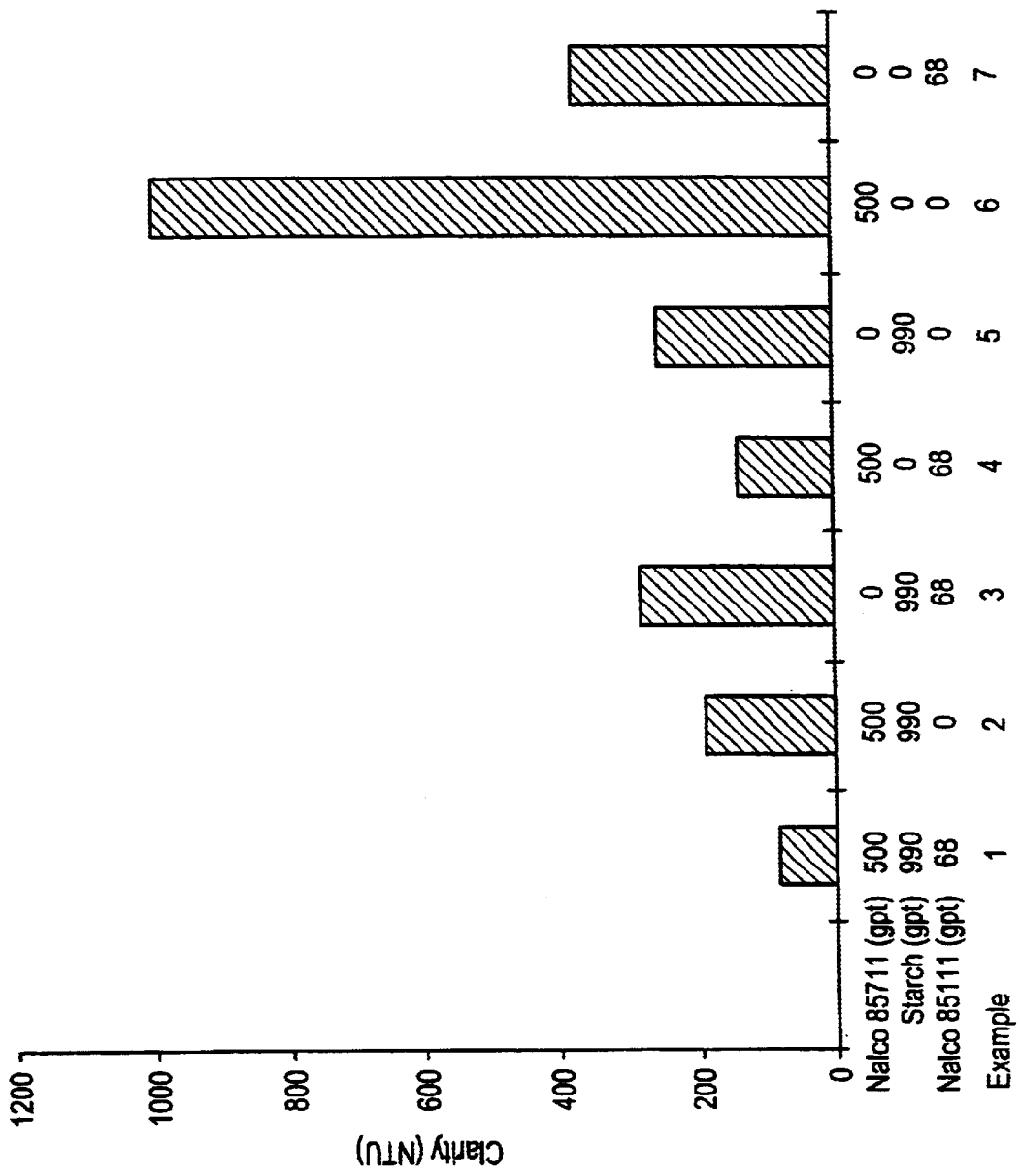

Results of the tests are shown in Table 3 and FIG. 2.

TABLE 3

COMPARATIVE EXAMPLES

| Eg | 85111 Conc (gpl) | 85111 Dose (ml) | Starch Conc (gpl) | Starch Dose (ml) | 85711 Conc (gpl) | 85711 Dose (ml) | Feed Solids (gpl) | Floc Dose (gpt) | Starch Dose (gpt) | 85711 Dose (gpt) | Srate T600 (secs) | Srate (m/h) | O/F Clarity NTU |
|---|---|---|---|---|---|---|---|---|---|---|---|---|---|
| 1 | 1.8 | 1.5 | 11 | 9 | 1 | 20 | 40 | 68 | 990 | 500 | 45 | 11.1 | 80 |
| 2 | 1.8 | 0 | 11 | 9 | 1 | 20 | 40 | 0 | 990 | 500 | 300 | 1.7 | 185 |
| 3 | 1.8 | 1.5 | 11 | 9 | 1 | 0 | 40 | 68 | 990 | 0 | 57 | 8.8 | 275 |
| 4 | 1.8 | 1.5 | 11 | 0 | 1 | 20 | 40 | 68 | 0 | 500 | 64 | 7.8 | 135 |
| 5 | 1.8 | 0 | 11 | 9 | 1 | 0 | 40 | 0 | 990 | 0 | 600 | 0.8 | 250 |
| 6 | 1.8 | 0 | 11 | 0 | 1 | 20 | 40 | 0 | 0 | 500 | — | <0.2 | 1000 |
| 7 | 1.8 | 1.5 | 11 | 0 | 1 | 0 | 40 | 68 | 0 | 0 | 80 | 6.3 | 370 |

The synergistic effect of the three constituent making up the treatment agent will be clear from these results and in particular FIG. 2. As can be seen from this figure, in each example where one of the constituent is left out, there is a substantial reduction in the clarity determined after five minutes. The closest comparative example is Example 4 in which only dextran and the water soluble synthetic flocculant are added to the Bayer process liquor. In this instance, clarity is measured at 135 NTU. This is nearly 70% higher than Example 1 using the proposed treatment agent (clarity 80 NTU). Other comparative examples are between two and 12 times less effective.

It will be clear to persons skilled in the art therefore that the combination of water soluble synthetic flocculant, dextran and starch provides a significant increase in the effectiveness of separation processes particularly sedimentation, centrifugation and filtration which is unrecognized and hitherto unsuspected from the prior art.

This invention also relates to the use of the combination of water soluble synthetic flocculant, dextran and starch for promoting coagulation or flocculation in other mineral slurries such as coal, kaolin, copper, precious metals, phosphate, taconite and refuse tailings obtained from these ores.

Changes can be made in the composition, operation and arrangement of the method of the present invention described herein without departing from the concept and scope of the invention as defined in the following claims.

What is claimed is:

1. A method for treating Bayer Process liquor containing red mud comprising (a) adding to the liquor a soluble synthetic flocculant and starch, wherein said soluble synthetic flocculant is selected from the group consisting of
  (i) homopolymers of acrylic acid,
  (ii) copolymers of acrylic acid and acrylamide,
  (iii) copolymers of acrylic acid and acrylamide modified to contain a hydroxamic acid moiety; and
  (iv) copolymers of acrylic acid and acrylamide modified to contain an comprises ammonium acrylate with a molecular weight greater than 10 million; and (b) adding to the liquor dextran; wherein the soluble synthetic flocculant to flocculate said red mud prior to the addition of the dextran, and wherein no additional synthetic flocculant is added to the liquor; and then (c) removing the flocculated red mud contained in the Bayer process liquor by sedimentation, centrifugation or filtration.

* * * * *